United States Patent [19]
Quick

[11] Patent Number: 5,819,622
[45] Date of Patent: Oct. 13, 1998

[54] AUTOMATED INFEED SYSTEM

[76] Inventor: Bradley S. Quick, 53 Connelly Dr., Staatsburg, N.Y. 12580

[21] Appl. No.: 731,452

[22] Filed: Oct. 15, 1996

[51] Int. Cl.$^6$ ........................................... B27B 5/04
[52] U.S. Cl. ..................... 83/365; 83/387; 83/418; 83/412; 83/435.2
[58] Field of Search .............. 83/418, 361, 365, 83/417, 423, 412, 425.2, 425.3, 387, 435.2, 471.2, 75.5; 144/245.2, 357, 378

[56] References Cited

U.S. PATENT DOCUMENTS

| | | | |
|---|---|---|---|
| 3,889,566 | 6/1975 | Hartzell et al. | 83/425.3 |
| 3,943,808 | 3/1976 | Pryor et al. | 83/928 |
| 4,163,321 | 8/1979 | Cunningham | 33/1 |
| 4,196,648 | 4/1980 | Jones et al. | 83/365 |
| 4,253,361 | 3/1981 | Pryor et al. | 83/417 |
| 4,262,572 | 4/1981 | Flodin | 83/471.2 |
| 4,281,696 | 8/1981 | Howard et al. | 83/365 |
| 4,468,992 | 9/1984 | McGeehee | 83/56 |
| 4,596,172 | 6/1986 | Visser | 83/367 |
| 4,690,188 | 9/1987 | Hasenwinkle | 144/378 |
| 4,881,584 | 11/1989 | Wislocker et al. | 83/423 |
| 5,249,491 | 10/1993 | Carter | 83/365 |
| 5,254,859 | 10/1993 | Carman et al. | 83/365 |
| 5,320,153 | 6/1994 | Knerr | 83/367 |
| 5,381,712 | 1/1995 | Head, Jr. et al. | 83/418 |
| 5,417,265 | 5/1995 | Davenport et al. | 83/425 |
| 5,429,161 | 7/1995 | Allard | 83/367 |
| 5,435,361 | 7/1995 | Knerr | 83/367 |

*Primary Examiner*—Maurina T. Rachuba
*Attorney, Agent, or Firm*—Stephen B. Ackerman

[57] ABSTRACT

An apparatus and related method for automatically infeeding workpieces to a saw includes a first workpiece that is selected at an input station. A servo-driven friction belt system is connected to the input station, and advances the workpiece under a pattern projection system. The pattern projection system causes a pattern to be projected onto the first workpiece. The pattern is one of a plurality of patterns corresponding to the blade configuration of a fixed arbor gang rip saw. An operator may select alternate patterns, and/or may skew the board to select the desired cut. A pinch roller system is provided for removing the workpiece from the friction belt system and moving the workpiece into the saw, while maintaining the desired skew, if any. Also provided is a sensor for measuring the board width while moving on the friction belt system, where the width is input to a computer controlling the infeed system and which determines the optimum pattern. The system also allows a second workpiece to be moved into position under the projection system while the first workpiece is being removed to be sawed.

4 Claims, 5 Drawing Sheets

AUTOMATED INFEED SYSTEM

BACKGROUND OF THE INVENTION (1) Field of the Invention

The invention relates generally to wood cutting equipment, and more particularly to automated feeding of fixed arbor gang rip saws and a method for minimizing scrap wood through optimizing the area of wood that is cut.

(2) Description of the Related Art

In operations involving the cutting of wood in, for example, sawmills, or in processing for the production of furniture, several considerations are taken into account in cutting wood economically. These include the speed with which the wood is fed to gang saws, the safety of the workers who are responsible for feeding the wood into the saws, and the number of pieces into which each board can be cut.

Another important consideration is the optimal way in which an incoming piece of wood stock of irregular shape can be cut to reduce waste. Typically, a log is first cut lengthwise along a number of parallel, axial planes to yield a number of irregularly shaped planks sometimes referred to as "cants". Cants cut from the same log all have the same length. However, the height (or width, when later placed flat on its broad side) of each cant will vary depending upon where on the diameter of the log the cut is made. Furthermore, the thickness of each plank will be determined by the spacing of saw blades, if the log is cut in a gang saw. Usually, when cutting planks or cants from the same log, the blades are set equidistant from each other so that the resulting planks all have the same thickness. While the thickness of each cant is therefore the same in this arrangement of the blades, the height of each cant, will vary depending upon the particular section of the log that is cut. For example, cants which are cut from sections close to the center of the log will be higher than those cut near the edges. Moreover, the cants will generally taper in one direction corresponding to the lessening diameter of the tree toward its top.

In the prior art, methods have been disclosed for maximizing the yield of wood stock. As disclosed in U.S. Pat. No. 4,468,992 (McGeehee), this means maximizing the total board feet of lumber derived from each log, although it may mean recovering a maximum number of boards of a certain length or having some other characteristic which makes them particularly valuable. Regardless of the particular optimization criteria employed, it is not obvious from examining an unfinished cant how to optimize the cutting of the cant into individual boards. For that reason McGeehee proposes an apparatus and a method where a cant is sawed simultaneously into a plurality of individual boards having optimum dimensions.

Figure 1A:
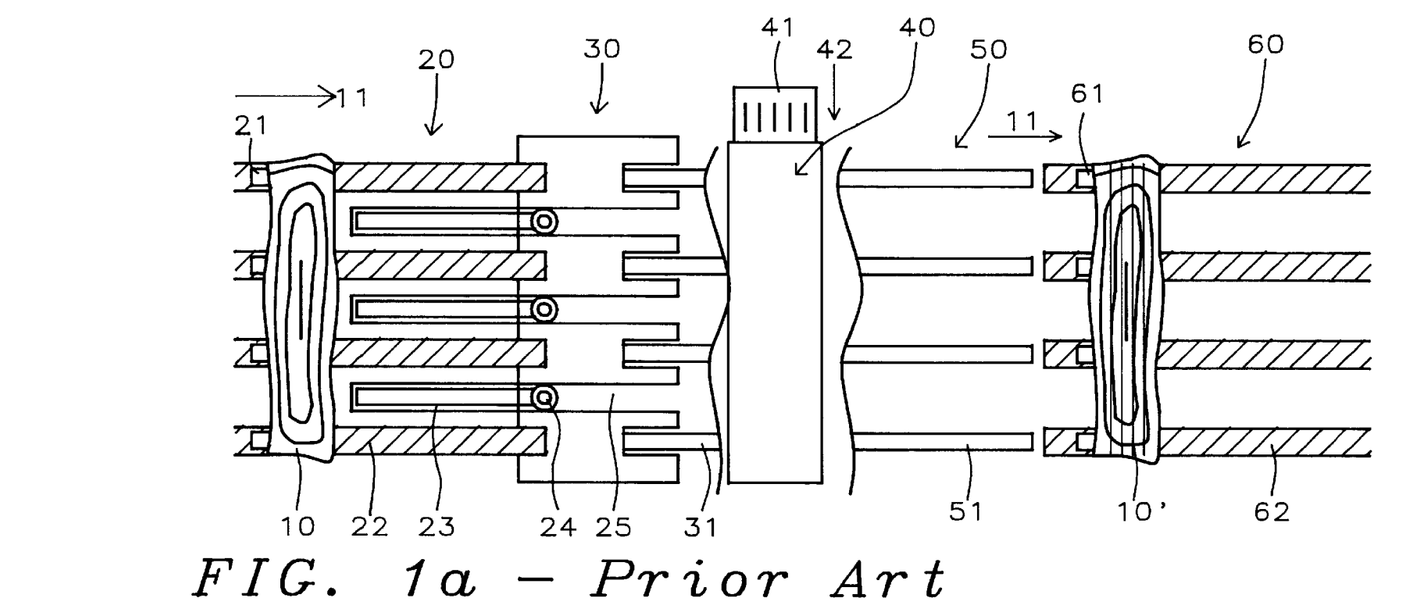
FIG. 1a is a plan view of a sawing system of the prior art.
Figure 1B:
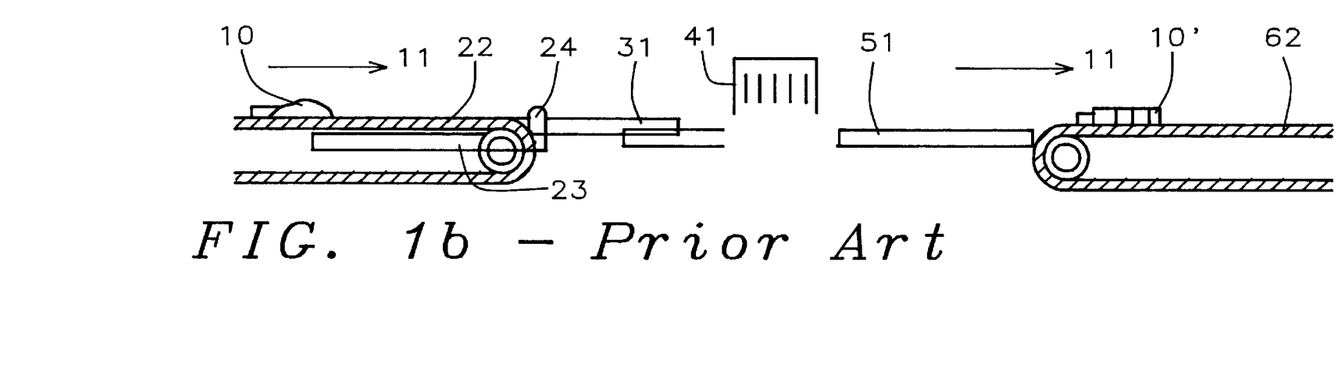

During a sawing operation, accurate alignment of planks or cants is important. One method of aligning is illustrated in FIG. 1a and 1b, in which alignment pins are used in a conveyor system. The system consists of an infeed conveyer 20 at one end and an outfeed conveyer 60 with a sawing table 40 in between. Both conveyers are conventional chain conveyers comprising a plurality of individual chains 22 and 62, respectively, and carrying with them lugs 21 and 61 to lug along cants 10 and 10' as shown in FIG. 1a. Chains 22 are driven synchronously so that advancing lugs 21 remain transversely aligned and cant 10 is advanced in normal direction to its elongate axis, i.e., in direction 11 to the right in FIG. 1a and 1b. Cant 10 is next transferred on to an optical scanning table 30 by means of infeed transfer arms 31. An optical system (not shown on table 30) comprising light sources, light detectors and reflectors is then used to gather information to determine the optimum orientation of cant 10.

The means of moving and at the same time aligning cant 10 in an apparatus of prior art such as shown in FIG. 1a and 1b can be quite complicated. Thus, each advancing rod 23 is fitted with a retractable pin 24 at its forward end. As described in U.S. Pat. No. 4,468,992, in its raised position, pin 24 projects upward through a slot 25 in the alignment table 30. When retracted, pin 24 remains below the surface of table 30. In order to advance cant 10 along table 30, certain selected pins 24 are raised and rods 23 are advanced to the right. By using two preselected pins 24 and advancing them by incrementally different lengths, the orientation of cant 10 can be adjusted as it is advanced over the infeed arms 31 and on to saw table 40. After sawing cant 10 into individual boards 10' using saw 41, the outfeed arms 51 lift the boards from sawing table 41 and transfer them onto outfeed conveyor 60. Boards 10' are taken from outfeed conveyer 60 for further processing.

Automatic sawing systems of earlier art required that, after initial alignment, the cant be translated axially under one or more stationary saws. It will be appreciated that it is generally difficult to maintain the alignment of the cant while it is being advanced beneath the saws. The need to advance the cant inhibits the ability to firmly hold the board in the preselected orientation. McGeehee proposes instead to hold the cant fixed on a table and cut it by means of moving saw blades 41 and in the direction 42, as shown in FIG. 1a and 1b. Nevertheless, the alignment that is performed by using chains and alignment pins is complicated.

It is instructive to also mention another prior art method where positive alignment is secured by first removing an edge of a cant by an overhead saw. Thereafter, the cant is advanced beneath overhead saws with the sawn edge held against a fixed side wall or fence. In this way, the alignment of the cant beneath the saws is improved, although after sawing the leading edge off, internal stress release can cause the "straight" edge to buckle resulting in misalignment. Further, if the cant is being cut by gang rip saws, there is no easy method to select different saw patterns—the only saw pattern used will be the one starting at the fence edge.

Infeed systems are generally one-sided, that is, wood stock is fed into the gang saw from one side only. There are some infeed systems of more recent vintage which employ two sides for feeding cants for the purposes of achieving higher yield and productivity. In U.S. Pat. No. 5,381,712 (Head), for example, the cants are supplied to loading stations arranged on opposite sides of the feeding station, whereupon prior to lateral transport to the feeding station, a cant at either of the loading stations is selectively oriented by the operator relative to a reference line parallel with the longitudinal infeed axis of the saw means, thereby to effect maximum yield from the cant. In taking advantage of the two-sided infeed system, however, a complex pivoting skewing tube and transport is introduced to obtain proper alignment of the cant. Additionally, a clamp is provided with the laterally shiftable skewing tube between loading stations for fixing the cant in a particular orientation for the sawing operation.

The present invention has been developed to provide an novel approach to the optimizing and automated feeding of fixed arbor gang rip saws without the complications associated with prior art apparatus and methods. The disclosed apparatus together with its new method of application bring much needed improvements to wood cutting operations, as discussed more in detail below.

SUMMARY OF THE INVENTION

It is therefore an object of this invention to provide an improved apparatus for automated feeding of a fixed arbor gang rip saw.

It is another object of this invention to provide an improved method for optimizing the sawing of wood pieces.

It is another object of this invention to provide an apparatus and method for selecting and maintaining a board orientation for feeding of a gang rip saw.

It is yet another object of the invention to provide an automated infeed system having a low cost simple method for selecting a board cutting pattern and advancing the board to a gang rip saw while maintaining a selected board orientation.

In accordance with the aforementioned objects, there is provided an apparatus for automatically infeeding workpieces to a saw, having a means for selecting one of a plurality of the workpieces at an input station. A servo-driven friction belt system is connected to the input station, and advances the workpiece under a pattern projection system. The projection system causes a pattern of lines to be projected onto the workpiece, the pattern corresponding to one of a plurality of patterns representing the blade configuration of a fixed arbor gang rip saw. Finally, there is a pinch roller system for removing the workpiece from the friction belt system and moving the workpiece into the saw, while maintaining the workpiece's original orientation under the pattern. Also provided is a sensor for measuring the board width while moving on the servo-driven friction belt system, where the width is input to a computer controlling the friction belt system and which determines the optimum pattern.

Also in accordance with the aforementioned objects, there is provided a method for automatically infeeding a workpiece to a saw, under control of a computer. A first workpiece is selected. The width of the first workpiece is measured, and the workpiece is advanced under a projected pattern, the pattern based on the workpiece width and on optimizing yield. An operator may select an alternative pattern by moving the first workpiece under the alternative patterns. An operator may also skew the first workpiece. The first workpiece is moved to the saw input while selecting a second workpiece and moving the second workpiece under a projected pattern. The first workpiece is submitted to the saw input while maintaining any desired skew.

BRIEF DESCRIPTION OF THE DRAWINGS

The objects and features of this invention will become apparent more readily from a reading of the detailed description in conjunction with the drawings that follow:

FIG. 1b is a side elevational view of the prior art sawing system of FIG. 1a.

DESCRIPTION OF THE PREFERRED EMBODIMENTS

Figure 2A:
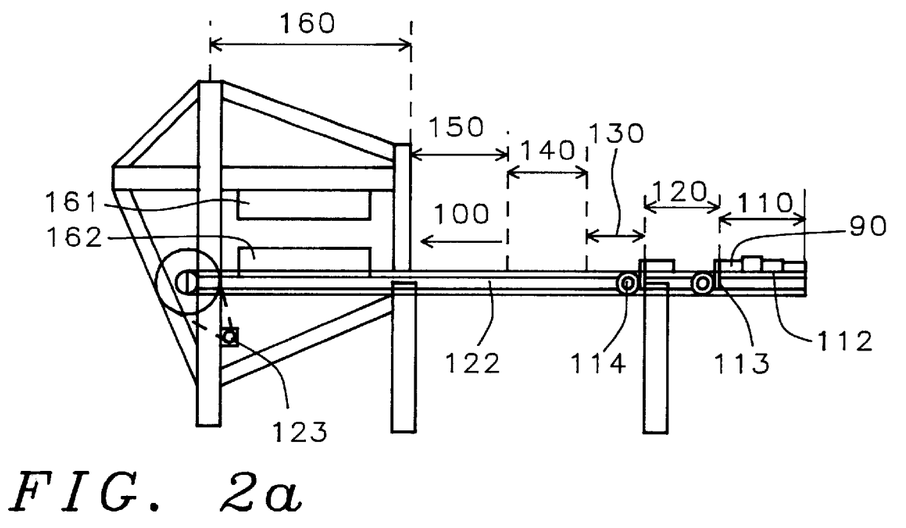
FIG. 2a is a side elevational view of the automated infeed system of the invention.
Figure 2B:
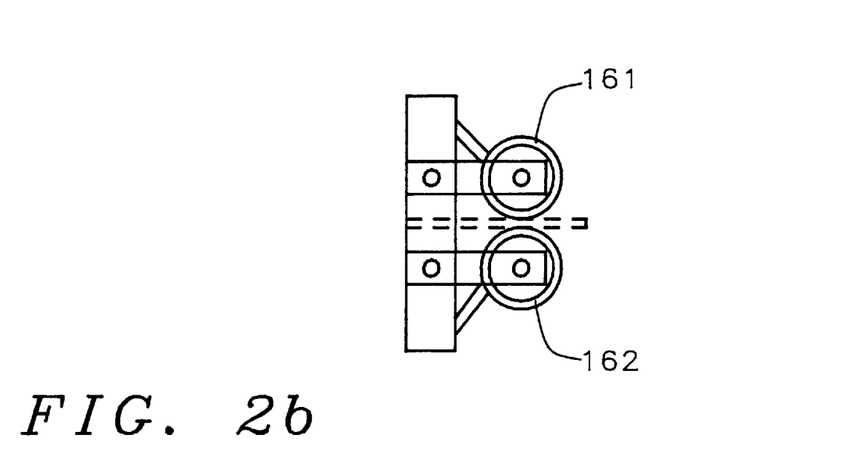
FIG. 2b is a side view of the pinch-roller subsystem of the invention.

Referring now to the drawings, in particular to FIGS. 2a and 2b, there are shown side and elevational views, respectively, of the automated infeed system constructed according to the principles of the present invention. In FIG. 2a, the stock is introduced at a board loading station 110, and continues through a pick-up station 120, board width measuring station 130, projection and optimization area 140, clear area 150 and saw feeding area 160. Fixed arbor gang rip saws 170 are shown in the plan view of FIG. 2c. Thus, boards 90 to be processed progress from right to left 100 on chains 112 and belts 122 until they reach the saw area 160. That is, as will be described in more detail shortly, the boards travel broadside in direction 100 until they are picked up by pinch-rollers 161 and 162 at which time they are fed lengthwise in direction 300 into the gang rip saw blades 170, with details of the pinch roller arrangement shown in side view in FIG. 2b. The sawed boards are then transferred away from the sawing system for further processing.

It will be observed in FIG. 2a that the transfer of boards from loading station 110 to the saw area 160 is accomplished by means of a series of chains 112 and belts 122 of which two subsets are shown in solid lines for purposes of illustration. The number and spacing of the chains and belts is not fixed but depends on such parameters as the board lengths to be processed, available floor space, etc. By way of example, six sets of chains and belts may be used, spaced apart at three-foot intervals. In such a setup, boards as long as 18 feet may be accommodated. The extendibility of the system is suggested by phantom lines 400 shown in FIG. 2c.

Considering now in more detail the operation of the auto infeed system of the present invention, boards 90 are input at load station 110 on a chain conveyer system 112 driven by chain drive 115. In the preferred mode, two or more chains are driven by one chain drive 115 connected to a motor not shown.

The boards first queue up against stop 113 and then are released singularly by lowering and raising the stop by means of pistons (not shown). Alternately, a single board may be supplied from a machine upstream and queued at stop 113. The board to be advanced is then placed on belt 122, by lowering the chains 112 by another set of pistons 114. A second stop 114' is also actuated by the same pistons 114. It will be appreciated that when chain 112 is lowered, board 90 will be picked up simultaneously by belt 122 which is also driven in direction 100. The belts are driven by a single servo motor 123 which is connected to a shaft 124 that is common to all the belts. Such mechanical connections are well known in the art and as they are not significant to the invention are not described here in detail.

Figure 2C:
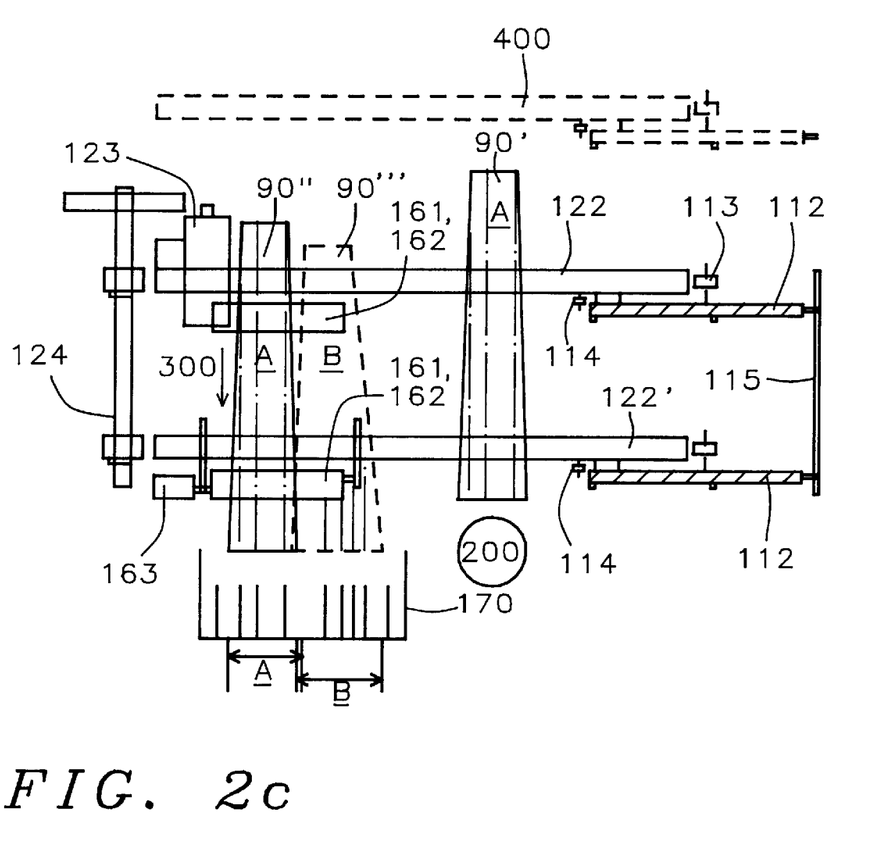
FIG. 2c is a plan view of the sawing system of FIG. 2a according to the present invention.

While chains 112 operate continuously, belts 122 are driven as commanded from an operator controlled console 200 shown in FIG. 2c. The inner surface (opposite to the surface contacting the wood pieces) of the belts have teeth to engage sprockets on the shaft 124, to allow for precise movement of the boards. The belt teeth are preferably composed of polyurethane. On the opposite side of the belt, a high degree of friction is required between the belt and boards—a rubber material is preferred, such as Linatex (TM) rubber.

After leaving stop 114', a selected wood piece is smoothly accelerated by the belt system past a sensor area 130, where the board width is measured accurately by means of, for example, a thru-beam type of optical sensor, coupled with position feedback operation from the servo motor driving the belts. One such sensor is the Omron (TM) model E3S-AT91.

As the board is smoothly accelerated and then decelerated toward projection area 140, the measured width of the board is compared with all possible rip patterns, for example 50 such patterns, that are stored in the computer memory of console 200 and which correspond to the existing arbor gang saw configuration 170. For purposes of illustration, gang saw 170 is comprised of nine blades which are spaced arbitrarily. It will be appreciated that many different combinations of rip patterns can be achieved with the given blades. Only two simple patterns (A) and (B) are presented here as shown in FIG. 2c. Thus, when board 90 arrives at projection area 140, the board is automatically and accurately positioned under a series of projected lines that represent the current arbor configuration, presenting the operator with a calculated optimum rip combination based on the measured width.

Assuming, for example, board 90' is automatically positioned for the optimum pattern (A) that will result in maximum yield (i.e., least scrap) as shown in FIG. 2c, and the operator accepts it as such, he presses a control on console 200, and the belts then move and position the board in front of the rip saw keeping it in the same relative position and orientation. Two sets of two pinch rollers 161 and 162, which are actuated by pistons (not shown) then capture the board and feed it into gang rip saw 170. In a preferred embodiment, the top pinch rollers are driven by the pistons against the board which is in turn driven against the bottom pinch rollers, and then the pinch rollers nearest the saw are driven by motor 163 to advance the board into the saw. It will be understood by those skilled in the art that the bottom pinch rollers may instead be driven to capture the board, or alternately that both the bottom and top pinch rollers may be driven.

The actual rip pattern (A) is shown to the operator by means of visible projected lines on the board at the projection area 140 (and on the computer screen at console 200, though the operator would typically rely on the projected pattern). Various systems known in the woodworking industry may be used to project lines on the boards, such as a shadowbox (in which a bright light is projected against a series of strings to create line shadows) or a laser system having one laser per line. A preferred laser unit is Lumber Line Lasers by John McCormick & Sons.

For each board, the operator is able to choose from many alternate rip patterns. For example, if a different pattern (B) appears preferable to the operator, perhaps to avoid ripping through a knot which would have resulted from using pattern (A), than he can choose that pattern and direct the system to align the board and present it to the saw accordingly as board 90''' with pattern (B) in FIG. 2c. The computer will at the same time post the calculated yield on the screen for that particular pattern. The operator can, by manipulating the board by hand, or by turning a venire knob on console 200 fine tune the positioning of the board.

In one key aspect of the invention, the operator may also manually skew the board at an angle other than perpendicular to the belts to, for example, avoid a knot or split in the board. Once the desired rip pattern and skew are determined, the operator advances the board to area 160 for pick-up by the pinch rollers 161 and 162. The friction belts 122 maintain the skew angle, and smoothly position the board for the desired rip pattern. This is in contrast to the related art systems which use a fence (thus providing for perpendicular orientations only) or a previously described complex arrangement of alignment pins.

For each board 90, therefore, two moves are commanded by the automated infeed system. The first move positions the visible board 90' at the projection area 140 to show the operator the computer solution for the optimum yield. The second move positions the same board 90'' in the pinch rollers 161 and 162 to match the arbor configuration with the chosen rip pattern.

It will be appreciated by those skilled in the art that an important feature of the present invention is its simplicity. This is made possible by the use of an industrial servo motor 123 which quickly and accurately positions the boards on the disclosed auto infeed system. In the preferred embodiment, the servomotor is a Kollmorgen # M605D-A3. The servo motor allows the disclosed system to feed the rip saw without using a fence, as noted above. This allows lumber to be fed in any orientation resulting in increased yield.

The control system of console 200 shown in FIG. 2c is typically a microprocessor based system having software developed specifically for the real time control of the apparatus of the present invention. Such control systems are commercially available and need not be described in detail. The control of mechanical systems is typically accomplished through digital to analog converters, or through direct digital-controlled servoactuators. Other direct digital outputs, such as a shaft encoder for determining the position of the belt conveyer, may also be employed. Such control instrumentation, included within console 200 in FIG. 2c is all within the scope of the art and will not be further described.

Once the various measurements such as width and length of boards are received by the computer, the software program calculates useful parameters such as yield, lineal feed and board length. While processing lumber, the computer constantly displays the yield data for the board being processed as well as the entire batch of lumber. As stated herein, the width measurement is accomplished by means of a sensor and is recorded by a counter. The length may be determined by various means, as is known in the art, such as through the use of another roller (not shown), subjacent to the pinch roller 162, that is used to calculate the board length by counting roller rotations as the board is being fed to the gang rip saw.

Other parameters that are determined by the computer include the optimum use of the board based on current value of different board sizes. The value data for lumber can be periodically fed into the computer and used to optimize the desired cut. The operation of the automated infeed system disclosed in this invention is a fully integrated system comprising the computer, feed-back instrumentation on the floor, and the operator's console 200.

Figure 3A:
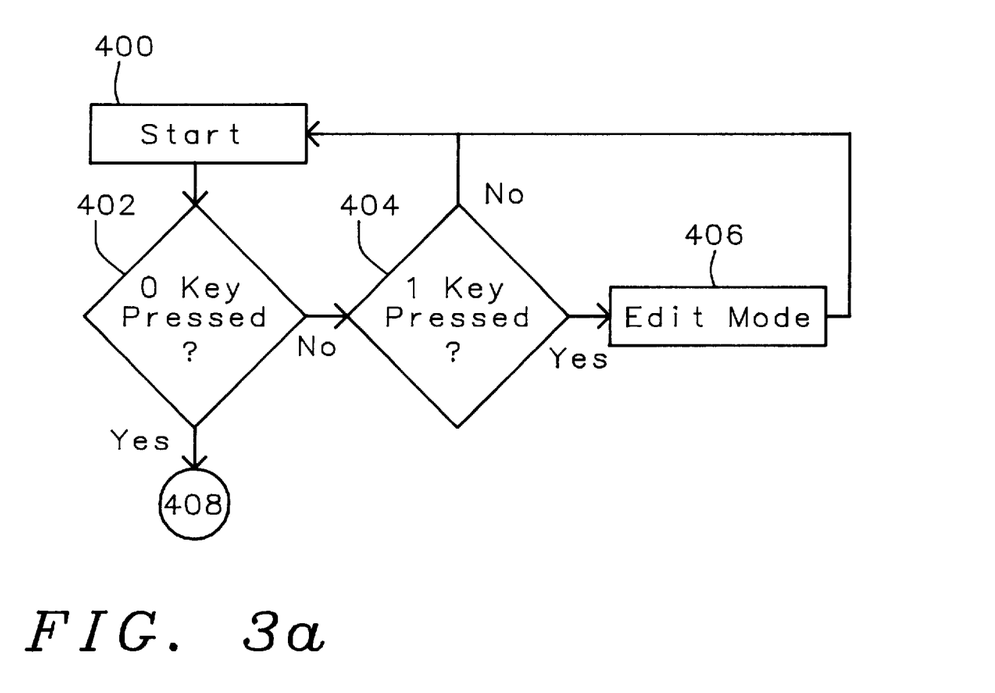
FIGS. 3a–3c represent by flowchart a computer program used to operate the automated infeed system of the invention.

In the preferred embodiment of this invention, the console is equipped with various operator controls. As depicted in the flow chart of FIGS. 3a–3c, these include a power control, or "start" button 400, and two primary buttons labelled "0 Key" 402 and "1 Key" 404. When the "1" button is pressed, the system is put into "Edit" mode 406. "Edit" mode allows the operator to modify various parameters such as saw blade positions. When the operator uses the "0" control, the system is put into "Run" mode 408. Four operational choices are then available and are labelled in FIGS. 3b and 3c, by way of example, as "Process" 410, "Deduct" 430, "Next" 450 and "Original" 470.

Figure 3B:
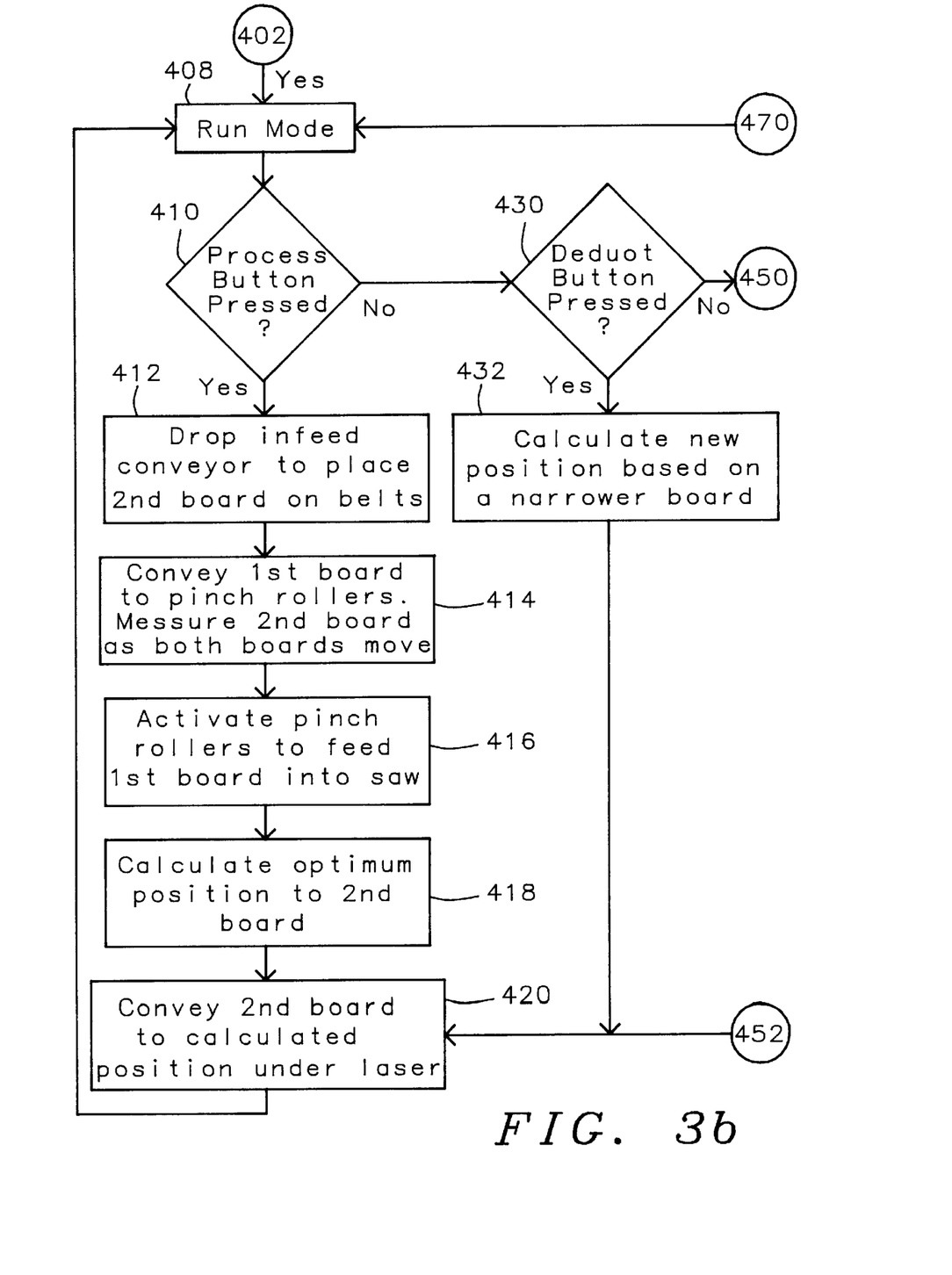
Figure 3C:
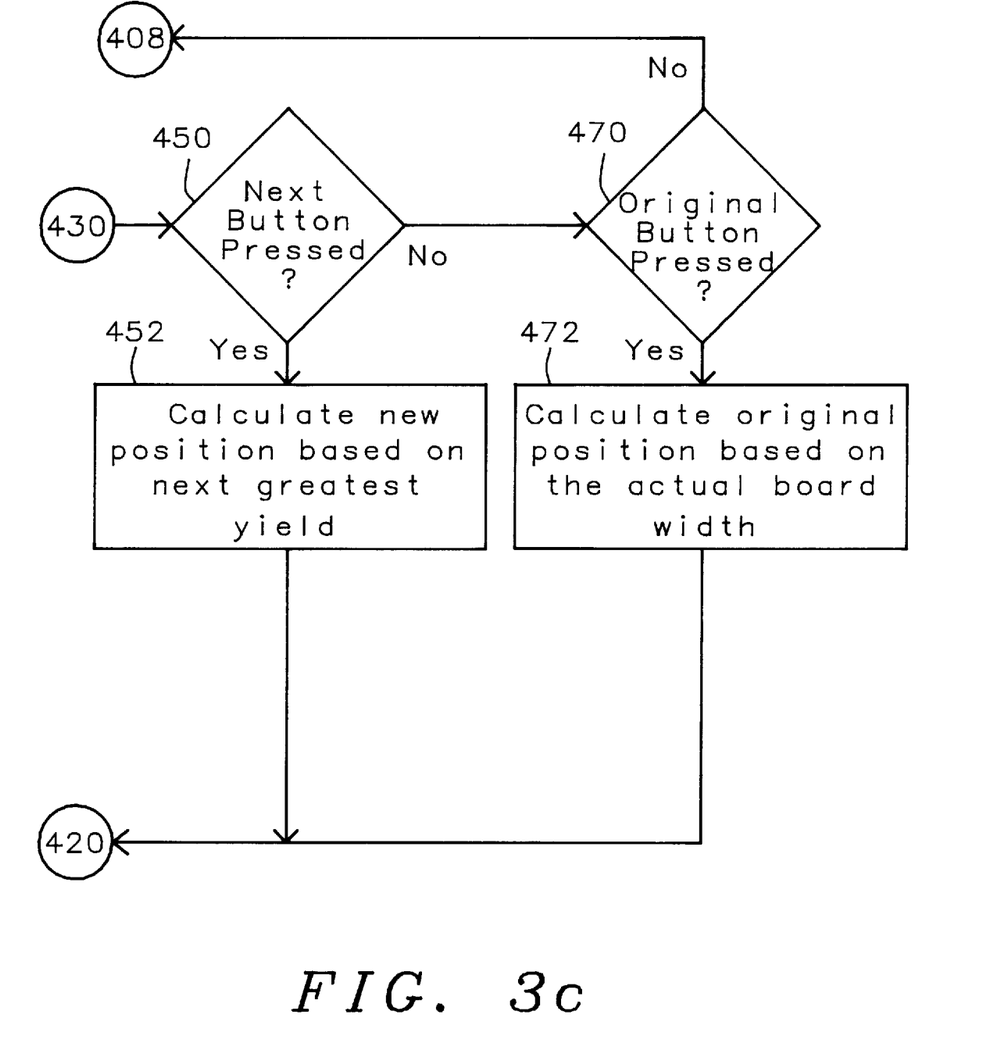

By using the "Process" control, the operator initiates a sequence of events in the following order as shown in FIGS. 3b and 3c (and with reference to previous drawings). First, in block 412, drop chain conveyor 112 to place a present board 90 in station 110 on belts 122 in station 120. Next, in block 414, convey the previous board to the pinch rollers 161,162, and measure the present board as it passes by station 130. Then, in block 416, activate the pinch rollers 161,162 to feed the previous board into the saw. Next, in block 418, calculate the optimum position for the present board. Finally, in block 420, convey the present board to the calculated position under projected lines projection area 140.

For the new or present board to be processed, the operator may determine that a narrower saw pattern is desired, for example if the operator desires to remove one edge of the board due to a knot at the board edge. To bring up a narrower pattern, the operator uses the "Deduct" control 430, and a new position for the board is calculated, in block 432, based on the narrower board size. If instead the operator simply wishes to have calculated 452 the next best saw pattern to the previous pattern, based on the next greatest yield, he may press the "Next" control 450. And finally, if the operator wishes to return to the original position, the "Original" control 470 is used, to calculate the original position based on board width as shown in block 472.

Subsequent to any one of the last three operations, the system automatically steps to process step 420 in FIG. 3b. In this manner, the disclosed automatic infeed system makes it possible for the sawing system to work with the peculiar characteristics of each piece of lumber rather than forcing the latter to conform to the constraints of the machine system.

The invention offers advantages over the prior art in providing a low-cost, simplified method and apparatus for the cutting of wood pieces using a gang rip saw, that provides additional flexibility in the manufacturing environment for optimizing yield. Wood pieces are scanned for width and an optimum saw pattern presented to the machine operator, who may select the optimum pattern or a variety of other patterns for cutting, taking into account visually the condition of the board. Using the novel apparatus of the invention, the operator may also skew the board if on visual inspection it is determined that such a skew would be desirable for optimizing the board cut. The board skew angle is then maintained automatically through the rest of the cutting operation, through the use of servo-driven friction belts, and a pinch roller system for accurately feeding the board to the gang rip saw for cutting with the selected rip saw pattern.

While the invention has been particularly shown and described with reference to the preferred embodiments thereof, it will be understood by those skilled in the art that various changes in form and details may be made without departing from the spirit and scope of the invention.

What is claimed is:

1. An apparatus for automatically infeeding workpieces to a saw, comprising:

an input station at which a workpiece, having a first orientation, is provided for further processing;

a servo-driven friction belt system connected to said input station, which advances said workpiece under a projection system, wherein said projection system projects a pattern onto said workpiece and wherein said pattern comprises one of a plurality of patterns corresponding to a portion of a plurality of blades of said saw, and wherein said workpiece may be given a second orientation, relative to said pattern, either manually or by said friction belt system; and a means for removing said workpiece from said friction belt system and moving said workpiece into said saw, while maintaining said second orientation.

2. The apparatus of claim 1 wherein said removing means comprises a pinch-roller system having opposed first and second pinch rollers, whereby at least one of said pinch rollers is driven against said workpiece, thereby driving said workpiece against the other said pinch roller.

3. The apparatus of claim 1 further comprising a programmable computer which controls said apparatus and is connected to and controls said servo-driven friction belt system and said removing means.

4. The apparatus of claim 1 further comprising a means for an operator to select alternative patterns, from said plurality of patterns, to have projected onto said workpiece.

* * * * *

UNITED STATES PATENT AND TRADEMARK OFFICE
CERTIFICATE OF CORRECTION

PATENT NO.   : 5,819,622  
DATED        : October 13, 1998  
INVENTOR(S)  : Bradley S. Quick Page 1 of 1

It is certified that error appears in the above-identified patent and that said Letters Patent is hereby corrected as shown below:

<u>Title page,</u>
Item [73], Assignee, add -- James L. Taylor Manufacturing Company (Poughkeepsie, NY) --.

Signed and Sealed this

Thirteenth Day of June, 2006

JON W. DUDAS
*Director of the United States Patent and Trademark Office*